(12) United States Patent
Cabello-Colón

(10) Patent No.: US 6,583,359 B1
(45) Date of Patent: Jun. 24, 2003

(54) COVER FOR ELECTRIC METER

(76) Inventor: Felipe A. Cabello-Colón, Urbanización Valles de San Luis, 272 Vía de la Vereda, Caguas, PR (US) 00725

( * ) Notice: Subject to any disclaimer, the term of this patent is extended or adjusted under 35 U.S.C. 154(b) by 0 days.

(21) Appl. No.: 10/075,533

(22) Filed: Feb. 13, 2002

(51) Int. Cl.[7] .................................................. H05K 5/03
(52) U.S. Cl. .................... 174/66; 174/66; 174/65 R; 174/67; 174/55; 174/56; 174/57; 220/3.8; 220/241; 220/242; 439/146; 439/147; 439/508; 439/912
(58) Field of Search ................................. 174/66, 65 R, 174/67, 55, 56, 57; 220/3.8, 241, 242; 439/146, 147, 508, 912

(56) References Cited

U.S. PATENT DOCUMENTS

| | | | | |
|---|---|---|---|---|
| 4,979,634 A | * | 12/1990 | Begley | 16/267 |
| 5,389,740 A | * | 2/1995 | Austin | 174/67 |
| 5,416,873 A | * | 5/1995 | Huebscher et al. | 385/95 |
| 5,603,201 A | * | 2/1997 | LaFata et al. | 206/471 |
| D400,507 S | * | 11/1998 | Monaco | D13/156 |
| 6,159,034 A | * | 12/2000 | Royer | 439/144 |

* cited by examiner

*Primary Examiner*—Dean A. Reichard
*Assistant Examiner*—Anton Harris
(74) *Attorney, Agent, or Firm*—Patent Law Offices of Heath W. Hoglund

(57) ABSTRACT

A protective cover for an electric meter includes a base and a face plate. The face plate attaches to the base by hinges. The face plate defines a hole sized to pass a glass cylinder that houses the meter display. In a closed position, the glass cylinder passes through the hole. In an open position, the glass cylinder is free of the face plate and the electric meter is freely accessible.

19 Claims, 7 Drawing Sheets

COVER FOR ELECTRIC METER

FIELD OF THE INVENTION

The invention relates generally to a cover for an electric meter, and more specifically to a hinged protective device suitable for a standard cylindrical electric meter.

BACKGROUND OF THE INVENTION

Electric meters are widely used to measure the amount of electric power used at a site. Their construction is generally standardized. They use a metal rectangular box for housing the wires and terminal connections between incoming power and loading circuits at the site. A glass cylinder extends from the box and houses a visible meter. In some installations, underground wires are fed from the electric power source to the electric meter. In other installations, above-ground elevated power-lines are fed from the electric power source to the electric meter.

U.S. Pat. No. 6,274,814, issued to Iavarone, and titled "Decorative Conduit Raceway Covering" shows above-ground elevated power lines fed from the electric power source. The patent shows a standard meter that is mounted on the outside of a house. The incoming power lines are fed through a conduit, then through a decorative covering system. This system includes a series of interconnected u-shaped covers. Both the incoming power lines to the electric meter and the power lines to the loading circuits within the house are covered by the u-shaped covers. The standard electric meter is also covered with an enclosure that is attached to the wall. The glass cylinder housing the electric meter protrudes through a hole in the front of this enclosure.

U.S. Pat. No. 5,377,074, issued to Byrd, and titled "Utility Meter Mounting Pedestal" shows below-ground power lines fed from the electric power source. The patent shows a standard meter that is mounted on the outside of a house. The incoming power lines are fed through an underground conduit that rises adjacent to an exterior wall. Although the conduit is shown on the outside of the exterior wall (see FIG. 1), it could also rise through the exterior wall itself. This would conceal the conduit from view. In either case, the conduit is passed to the electric power meter, which is mounted on the exterior of the building.

Although both of the above-mentioned patents effectively. enclose the power meter, both are relatively unattractive. Both detract from the ascetic appearance of a building.

SUMMARY OF THE INVENTION

According to one aspect of the invention, a cover for a electric power meter is constructed of a plastic material suitable for painting to match the color of an exterior wall. The electric power meter includes a glass cylinder for a meter display. The cover is mounted on a wall to enclose the power meter console. The cover includes a base, a face and hinges. The base defines a plurality of mounts for securing the base to the exterior wall. The face defines a hole positioned to pass the meter cylinder. The hinges connect the face to the base. The face has a closed position against the base that completely covers the electric power meter with the meter cylinder passing through the hole. The face also has an open position that permits access to the electric power meter and separates the face from the electric power meter so that the meter cylinder does not extend through the hole.

According to further aspects of the invention, the base is formed of a u-shaped channel. The u-shaped channel defines an interior passage extending fully around the electric power meter. A pair of side walls of the u-shaped channel extend substantially perpendicular from the exterior wall. A front surface joins the pair of side walls along an end opposite the exterior wall.

The hinges are formed by a set of sleeves that extend from a top portion of the base, a set of sleeves that extend from a top of the face and engage the set of sleeves that extend from the base, and a set of pins that extend through the sleeves along a common axis. The face and the base are connected by the pins so that the face rotates about the axis defined by the pins.

The face includes a first and a second sub-body, a front panel and an address panel. The first sub-body defines a first front and a first side wall that extends back from the first front to meet the front surface of the u-shaped channel of the base when the face is in the closed position. The first side wall extends around a first outer perimeter of the first sub-body. The first outer perimeter extends around the interior passage defined by the u-shaped channel of the base. The second sub-body defines a second front and a second side wall that extends back from the second front to join with the first front. The second side wall extends around a second outer perimeter of the second sub-body. The second outer perimeter is smaller than the first outer perimeter. The front panel is recessed from the second front of the second sub-body. The front panel defines the hole positioned to pass the meter cylinder. The address panel is recessed from the front panel. The address panel is positioned adjacent to the hole and adapted to receive a label plate for an address.

The cover further includes a hasp and a lock. The hasp is positioned along the bottom of the face. The hasp includes a sleeve extending from the face and a sleeve extending from the base. When the face is in the closed position, the sleeve extending from the face aligns with the sleeve extending from the base. The lock passes through the sleeve extending from the face and the sleeve extending from the base.

According to another aspect of the invention, an apparatus to decoratively cover an electric power meter includes a substantially rectangular base and a substantially rectangular cover. The rectangular base defines a plurality of mounts for connecting the rectangular base with a wall. The rectangular base defines an interior passage sized to fit around a standard electric power meter console. The rectangular cover attaches to the rectangular base. The rectangular cover defines a circular hole sized to pass a meter cylinder connected to the standard electric power meter base. The rectangular cover has an open and a closed position. When the rectangular cover is in the closed position, the rectangular cover completely encloses the standard electric power meter base except a portion of the meter cylinder that passes through the circular hole. When the rectangular cover is in the open position, the standard electric power meter base and the meter cylinder are completely accessible.

According to further aspects of the invention, the apparatus also includes a hinge and a hasp. The hinge has a first sleeve, a second sleeve and a pin. The first sleeve extends from the rectangular base. The second sleeve extends from the rectangular cover so that the first and second sleeves are aligned. The pin passes through the first and the second sleeve so that the rectangular cover rotates about the pin as it moves between the open and closed positions. The hasp attaches along a side of the rectangular cover opposite to the hinge.

According to further aspects of the invention, the rectangular base is formed of a paintable plastic. The rectangular base includes an inner and an outer wall, and an front plate. The inner and an outer walls extend substantially perpendicular from the wall on which the apparatus is mounted. The front plate joins the inner and outer walls. The front plate defines a plurality of holes that form the plurality of mounts.

According to further aspects of the invention, the rectangular cover is formed of a paintable plastic. The rectangular cover includes a rectangular front face and side walls. The rectangular front face has a recessed plate defining the circular hole. The side walls extend from the front face and around the perimeter of the rectangular front face. The rectangular front face defines the circular hole and wherein the side walls meet the rectangular base when the rectangular cover is in the closed position.

Still further aspects of the invention will be appreciated with reference to the drawings and detailed description that follow.

DETAILED DESCRIPTION OF THE INVENTION

In one preferred embodiment of the invention, a protective cover is provided for a standard electric meter. The standard electric meter includes a metal casing built into or attached to a wall and a glass cylinder that extends from the metal casing and houses a power meter. Preferably, wires to the meter are run within the wall and are not visible. The face of the power meter should remain exposed so that it can be easily read. The protective cover shields the metal casing both for protection and to provide a more attractive appearance.

The protective cover includes two main parts, a base and a hinged face. The base is mounted to the wall surrounding the electric power meter. The hinged face attaches to the base by hinges. In a closed position, the glass cylinder extends through a circular hole in the hinged face. In an open position, the glass cylinder and metal casing are exposed. This permits easy access to the meter for repair or other maintenance.

According to another preferred aspect of the invention, the protective cover is made of a plastic especially suitable for painting. The protective cover provides a simple mechanism to ease the painting process. The protective cover may be painted along with the wall on which it is mounted. The hinged face is lifted to an open position. Both the base and the hinged face are then painted in the open position. This mechanism avoids the need to tape or otherwise cover the glass cylinder when painting the protective cover. Since the hinged face is lifted away while it is painted, the hinged face may be painted with a brush or other applicator to avoid contact between the brush and the glass cylinder.

Although the entire protective cover is preferably painted while in the open position, it would also suffice to paint the portion of the hinged face surrounding the glass cylinder while in the open position. This reduces the risk of inadvertently contacting the glass cylinder with the brush.

After the base and hinged face are painted, the cover is lowered to the closed position. If only the portion of the hinged face surrounding the glass cylinder was painted, then the remainder of the hinged face is then painted. This provides a simple and attractive mechanism that significantly reduces the chance that the glass cylinder will be painted inadvertently. It also provides an attractive finish for the electric power meter that blends in with the rest of the wall.

Figure 1:
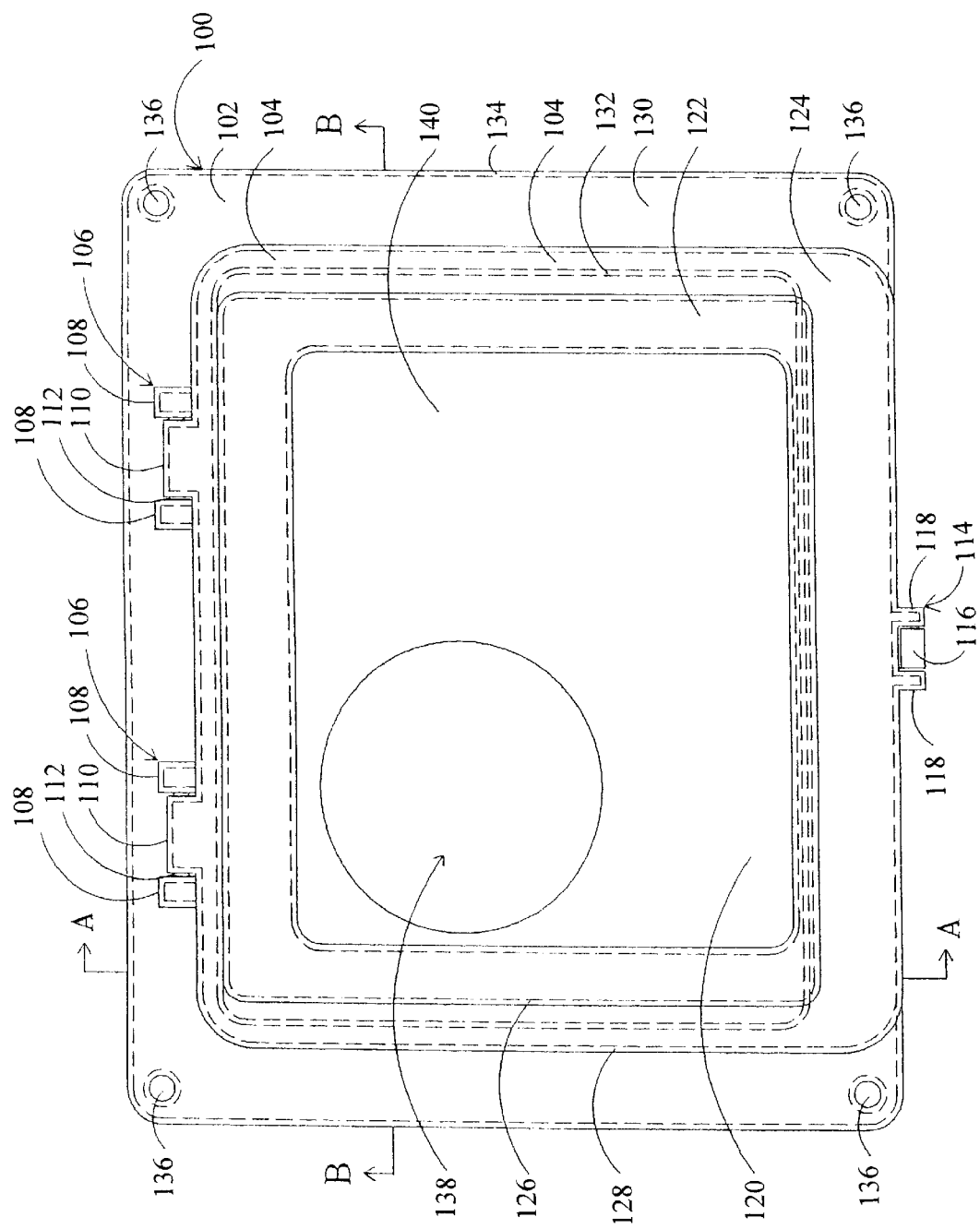
FIG. 1 is a front plan view of one preferred electric meter cover.

Turning to FIG. 1, one preferred protective cover 100 will be described in further detail. The protective cover 100 includes two primary parts, a base 102 and a face 104. The base 102 mounts on a wall around an electric power meter. Face 104 attaches to base 102 by hinges 106 along its top. More specifically, hinges 106 are formed by base mounts 108 and face mounts 110. The base mounts 108 extend from base 102 and each defines an interior sleeve for receiving a pin that forms the hinge axis. Similarly, face mounts 110 extend from face 104 and each defines an interior sleeve for receiving the pin that forms the hinge axis. Each of the face mounts 110 is positioned between two base mounts 108. Pins 112 run through the sleeves defined by base mounts 108 and face mounts 110. One pin 112 passes through one face mount 110 and is engaged on both ends by base mounts 108.

Together hinges 106 provide upper pivot points for the face 104. The axis of rotation for hinges 106 are aligned so that face 104 freely rotes from a closed position as shown, to an open position. In the closed position, hasp 114 provides a locking mechanism. Hasp 114 includes a base sleeve 116 and a pair of face caps 118. The base sleeve connects with base 102. The pair of face caps 118 connect with face 104. Face caps 118 each define an interior sleeve. When the face 104 is in a closed position, the base sleeve 116 aligns along a common axis with the interior sleeves defined by face caps 118. Face caps 118 are positioned on both ends of base sleeve 116. Face 104 can be locked in the closed position by passing a lock through these sleeves.

Face 104 is formed of three sub-parts, a panel 120, a sub-body 122, a sub-body 124. Panel 120 defines a hole 138. When face 104 is in the closed position, the glass cylinder encasing the electric power meter extends through hole 138. Hole 138 is sized just slightly larger than the glass cylinder so that it will pass through the hole 138 as the face 104 is rotated from a closed to an open position, and vice versa.

Panel 120 is formed as a flat recess in sub-body 122. Sub-body 122 is substantially rectangular with rounded corners. It is formed by a front and a side wall 126 that extends around its perimeter. Side wall 126 is substantially perpendicular to the front and to the wall on which the protective cover is mounted.

Side wall 126 joins with a front of sub-body 124. Like sub-body 122, sub-body 124 is substantially rectangular with rounded corners. Sub-body 124 is slightly larger than sub-body 122. It is sized to cover the interior passage defined by base 102. Sub-body 124 includes a side wall 128 that extends substantially perpendicular from the front. Side wall 128 extends around the perimeter of the sub-body 124. In the closed position, side wall 128 rests against base 102 to enclose the electric power meter.

Together, sub-body 122 with side walls 126 and sub-body 124 with side walls 128, create a two-step appearance. This operates to extend panel 120 so that a greater portion of the glass cylinder is enclosed. It also creates a more aesthetically pleasing appearance.

Figure 2:
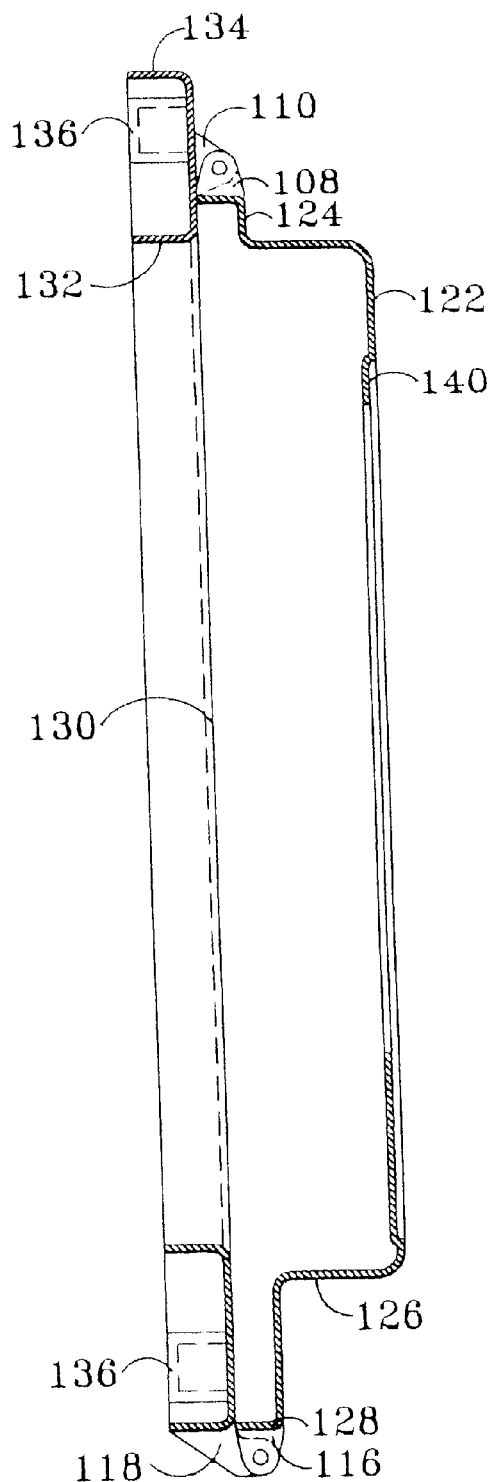
FIG. 2 is a cross sectional view of the electric meter cover of FIG. 1 taken along A—A.

Turning to FIG. 2, a cross sectional view of the protective cover is described as taken along cross section A—A of FIG. 1. As shown, side wall 128 meets base front 130 between inner side wall 132 and outer side wall 134 along the top. Side wall 128 meets front 130 proximate outer side wall 134 along the bottom.

Base 102 is formed by a u-shaped channel that extends around its perimeter. The u-shaped channel includes the inner side wall 132 and the outer side wall 134. These are mounted against a wall on their inner end. On their outer end they are joined by base front 130. This u-shaped channel defines an inner passage in the base that is large than a standard electric meter assembly. Thus, base 102 can be mounted around such a meter.

Figure 3:
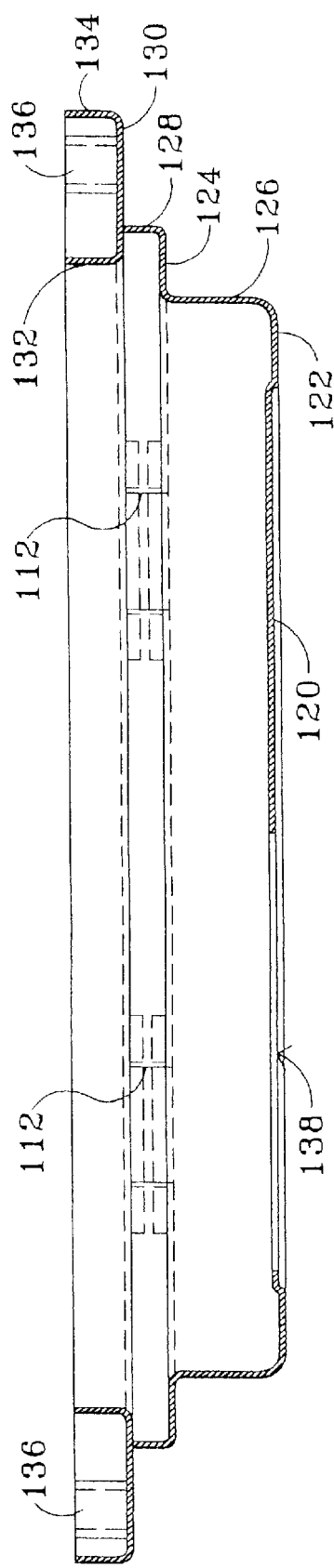
FIG. 3 is a cross sectional view of the electric meter cover of FIG. 1 taken along B—B.

Turning to FIG. 3, a cross sectional view of the protective cover is described as taken along cross section B—B of FIG. 1. As shown, side wall 128 meets front 130 between inner wall 132 and outer wall 134 on both sides. Mounting holes 136 are formed into base 102. Mounting holes are formed as a sleeve that extends approximately the same depth as the inner side wall 132 and the outer side wall 134. Inner side wall 132 and outer side wall 134 are substantially the same depth.

Figure 4:
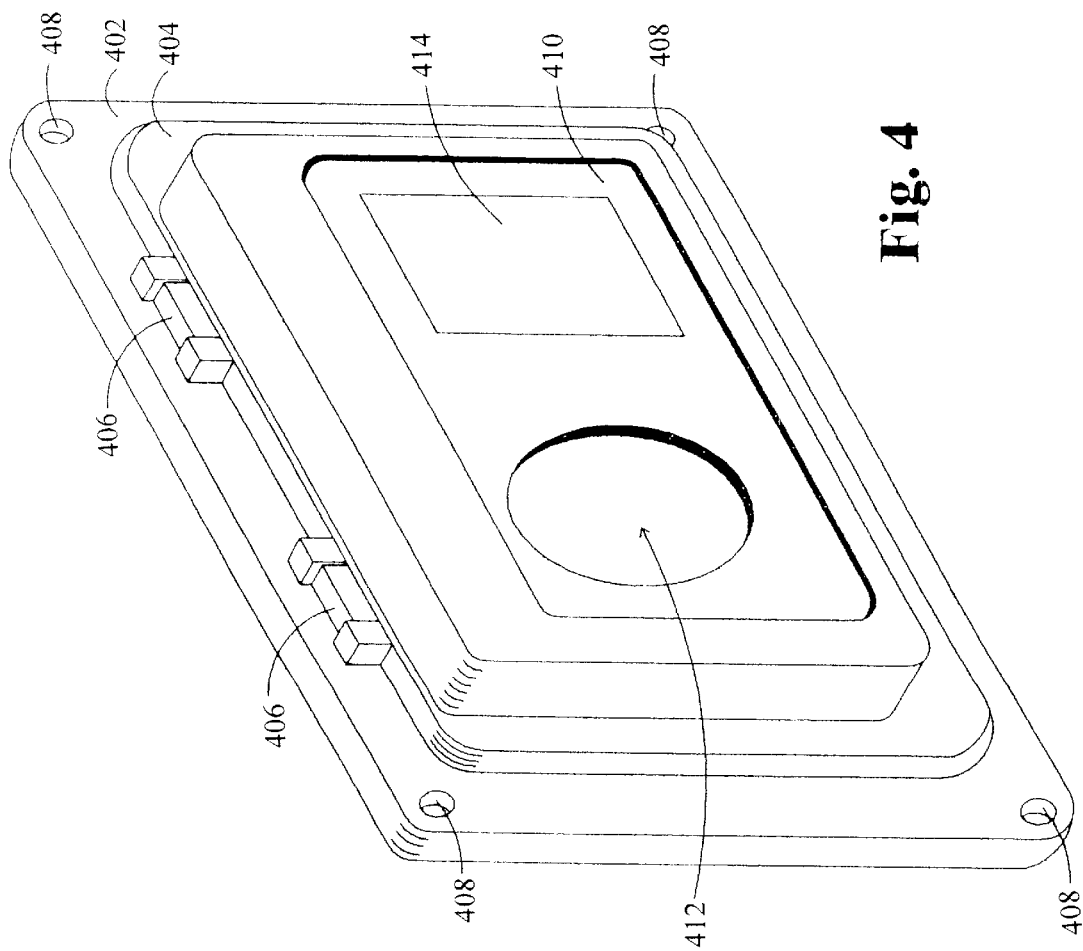
FIG. 4 is a perspective view of another preferred electric meter cover.

Turning to FIG. 4, another preferred embodiment of the invention is described. Here the enclosure includes a base 402 and a cover 404. The cover 404 attaches to the base 402 by hinges 406. The cover 404 is shown in the closed position. Base 402 defines four mounting holes 408 positioned in each corner of the base. Base 402 is preferably mounted around a standard electric meter. Cover 404 includes a front face 410 that defines a circular hole 412, which is sized for a standard electric meter. The enclosure is positioned around the standard electric meter so that the glass cylinder for the meter extends through the circular hole 412 in cover 404. Mounting screws are passed through holes 408 to hold the enclosure in place.

Front face 410 also includes a recessed panel 414. Recessed panel 414 is configured to hold an address or label plate. The label plate is glued in place within the recess. Recessed panel 414 is positioned adjacent to circular hole 412. Preferably, the recessed panel 414 is rectangular and is sized to fit an address plate that is mounted thereon. Together, circular hole 412 and recessed panel 414 substantially fill the area of front face 410. Alternatively, a larger recess may be used to house an electronic display.

Figure 5:
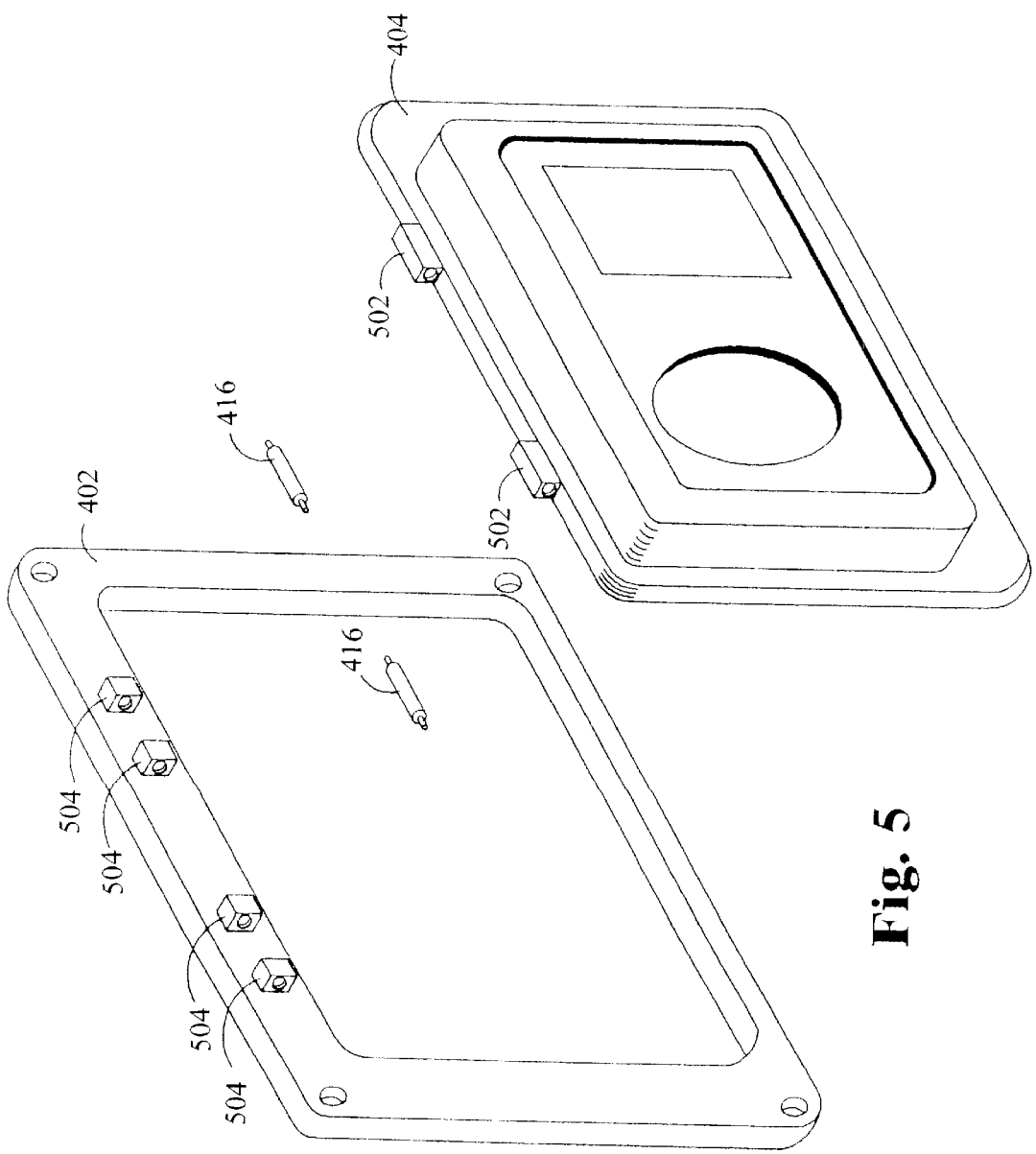
FIG. 5 is an exploded view of the electric meter cover of FIG. 4.

Turning to FIG. 5, an exploded view of the enclosure of FIG. 4 is described. It includes base 402 and front cover 404. Pins 416 join the base 402 to the front cover 404. Specifically, each pin 416 passes through a face mount 502. Each end of the pins 416 engage a cap 504.

Figure 6:
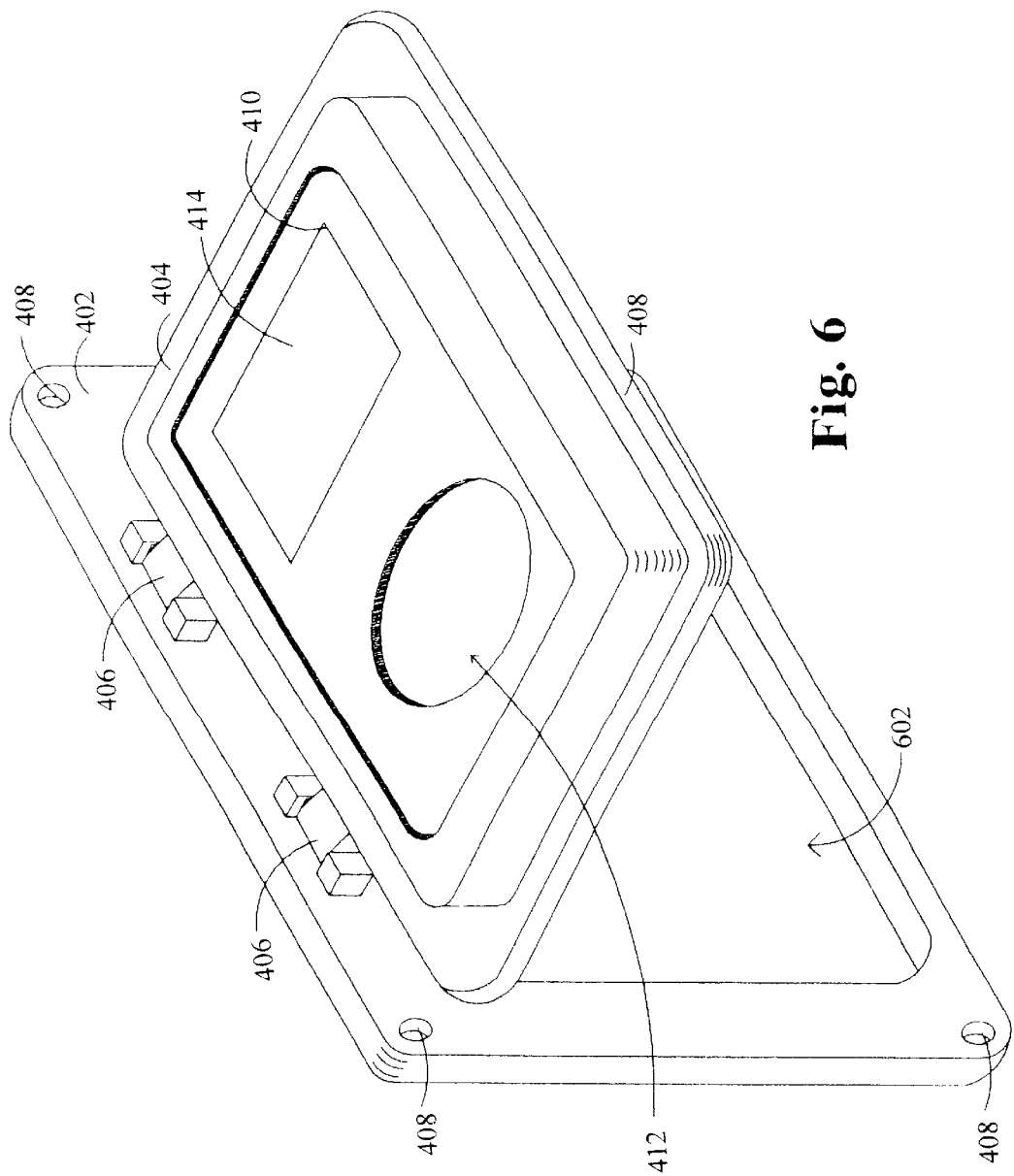
FIG. 6 is a perspective view of the electric meter cover of FIG. 4, shown with the electric meter cover in an open position.

Turning to FIG. 6, the enclosure of FIG. 4 is described in an open position. Cover 404 pivots about hinges 406. This provides access to an interior channel 602 defined by base 402. In this position, maintence can be made to the electric power console. Hole 412 passes over the glass cylinder (not shown in this FIG. 6) so that it is completely free of the enclosure as well.

Figure 7:
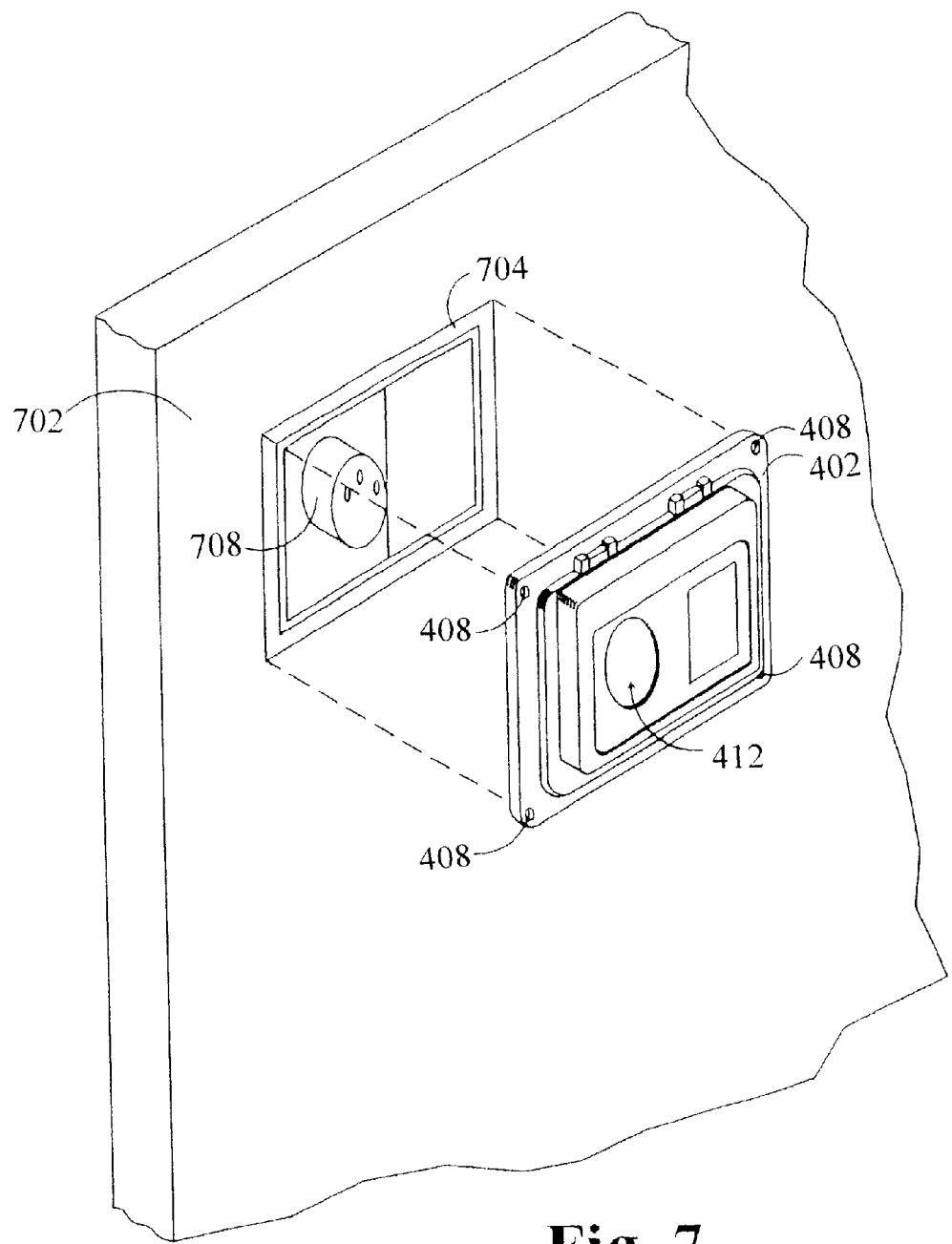
FIG. 7 is a perspective view of the electric meter cover of FIG. 6, shown being placed over an electric power meter console.

Turning to FIG. 7, the enclosure of FIG. 4 is shown as it is being placed over an electric power meter console 704. Specifically, the electric power meter console 704 is mounted on a wall 702. Wiring to the power meter console 704 is enclosed within the wall 702. The base 402 is aligned to completely cover the electric power meter console 704. The hole 412 is aligned so that glass cylinder 706, which encloses the visible meter, passes therethrough. Fasteners such as concrete lag screws are passed through holes 408 to secure the enclosure to the wall 702.

Although the invention has been described with reference to specific preferred embodiments, those skilled in the art will appreciate that many variations and modifications are possible without departing from the scope and spirit of the invention. All such variations and modifications are intended to be encompassed within the scope of the following claims.

I claim:

1. An electric power meter cover constructed of a plastic material suitable for painting to match the color of an exterior wall to which the electric power meter cover is mounted, wherein the electric power meter comprises:

a base defining a plurality of mounts for securing the base to an exterior wall to surround an electric power meter having a base and a meter cylinder extending therefrom;

a face defining a hole positioned to pass the meter cylinder and having a flat recess panel adjacent the hole; and a plurality of hinges connecting the face to the base so that the face has a closed position against the base that completely covers the electric power meter with the meter cylinder passing through the hole, and an open position that permits access to the electric power meter and separates the face from the electric power meter so that the meter cylinder does not extend through the hole.

2. The electric power meter of claim 1, wherein the base further comprises a u-shaped channel that forms the base and wherein the u-shaped channel defines an interior passage extending fully around the electric power meter.

3. The electric power meter of claim 2, wherein the u-shaped channel includes a pair of side walls that extend substantially perpendicular from the exterior wall, and a front surface that joins the pair of side walls along an end opposite the exterior wall.

4. The electric power meter of claim 3, wherein:

the base further defines a set of sleeves that extend from the base;

the face defines a set of sleeves that extend from the base to engage the sleeves that extend from the base; and the plurality of hinges comprise a set of pins that extend through the sleeves along a common axis so that the face and the base are connected by the pins and so that the face rotates about the axis defined by the pins.

5. An electric power meter cover constructed of a plastic material suitable for painting to match the color of an exterior wall to which the electric power meter cover is mounted, wherein the electric power meter comprises:

a base defining a set of sleeves that extend from the base and a plurality of mounts for securing the base to an exterior wall to surround an electric power meter having a base and a meter cylinder extending therefrom, and wherein the base further comprises a u-shaped channel that forms the base and wherein the u-shaped channel defines an interior passage extending fully around the electric power meter, and wherein the u-shaped channel includes a pair of side walls that extend substantially perpendicular from the exterior wall, and a front surface that joins the pair of side walls along an end opposite the exterior wall;

a face defining a hole positioned to pass the meter cylinder and a set of sleeves that extend from the base to engage the sleeves that extend from the base, wherein the face comprises:
- a first sub-body defining a first front and a first side wall that extends back from the first front to meet the front surface of the u-shaped channel of the base when the face is in the closed position, wherein the first side wall extends around a first outer perimeter of the first sub-body, and wherein the first outer perimeter extends around the interior passage defined by the u-shaped channel of the base,
- a second sub-body defining a second front and a second side wall that extends back from the second front to join with the first front, wherein the second side wall extends around a second outer perimeter of the second sub-body, and wherein the second outer perimeter is smaller than the first outer perimeter, and
- a front panel recessed from the second front of the second sub-body, and wherein the front panel defines the hole positioned to pass the meter cylinder;

a plurality of hinges connecting the face to the base so that the face has a closed position against the base that completely covers the electric power meter with the meter cylinder passing through the hole, and an open position that permits access to the electric power meter and separates the face from the electric power meter so that the meter cylinder does not extend through the hole, wherein the plurality of hinges comprise a set of pins that extend through the sleeves along a common axis so that the face and the base are connected by the pins and so that the face rotates about the axis defined by the pins.

6. The electric power meter of claim 5, wherein the face further defines an address panel recessed from the front panel, positioned adjacent to the hole and adapted to receive a label plate for an address.

7. The electric power meter of claim 1, wherein the plurality of hinges are positioned along a top of the face, and wherein the electric power meter further comprises:
- a hasp positioned along the bottom of the face, wherein the hasp includes a sleeve extending from the face and a sleeve extending from the base so that when the face is in the closed position the sleeve extending from the face aligns with the sleeve extending from the base; and
- a lock passing through the sleeve extending from the face and the sleeve extending from the base.

8. An apparatus to decoratively cover an electric power meter comprising:
- a substantially rectangular base defining a plurality of mounts for connecting the rectangular base with a wall, wherein the rectangular base defines an interior passage sized to fit around a standard electric power meter base; and
- a substantially rectangular cover attached to the rectangular base and defining a recessed panel and a circular hole sized to pass a meter cylinder connected to the standard electric power meter base, wherein the rectangular cover has an open and a closed position, configured so that when the rectangular cover is in the closed position the rectangular cover completely encloses the standard electric power meter base except a portion of the meter cylinder that passes through the circular hole, and so that when the rectangular cover is in the open position the standard electric power meter base and the meter cylinder are completely accessible.

9. The apparatus of claim 8, wherein the base comprises:
- an inner and an outer wall that extend substantially perpendicular from the wall, and
- a front plate joining the inner and outer walls, and wherein the front plate defines a plurality of holes that form the plurality of mounts.

10. The apparatus of claim 8, wherein the rectangular cover further comprises a rectangular front face and side walls extending therefrom around the perimeter of the rectangular front face, wherein the rectangular front face defines the circular hole and wherein the side walls meet the rectangular base when the rectangular cover is in the closed position.

11. The apparatus of claim 10, wherein the rectangular cover further comprises a face plate recessed from the rectangular front, wherein the face plate defines the circular hole.

12. The apparatus of claim 8, wherein the rectangular cover further comprises a recessed panel in the face plate positioned adjacent to the circular hole, wherein the recessed panel is configured to hold an address plate.

13. The apparatus of claim 8, further comprising a hinge having:
- a first sleeve extending from the rectangular base,
- a second sleeve extending from the rectangular cover so that the first and second sleeves are aligned,
- a pin passing through the first and the second sleeve so that the rectangular cover rotates about the pin as it moves between the open and closed positions.

14. The apparatus of claim 13, further comprising a hasp attached along a side of the rectangular cover opposite to the hinge.

15. The apparatus of claim 8, wherein the rectangular base and the rectangular cover are composed of a paintable plastic material.

16. The apparatus of claim 8, further comprising:
- a hinge a hinge having:
  - a first sleeve extending from the rectangular base,
  - a second sleeve extending from the rectangular cover so that the first and second sleeves are aligned,
  - a pin passing through the first and the second sleeve so that the rectangular cover rotates about the pin as it moves between the open and closed positions, and
- a hasp attached along a side of the rectangular cover opposite to the hinge, and wherein
- the rectangular base is formed of a paintable plastic and further comprises:
  - an inner and an outer wall that extend substantially perpendicular from the wall, and
  - a front plate joining the inner and outer walls, and wherein the front plate defines a plurality of holes that form the plurality of mounts;
- the rectangular cover is formed of a paintable plastic and further comprises:
  - a rectangular front face having a recessed plate defining the circular hole and a recessed panel formed in the recessed plate configured to hold an address plate; and
  - side walls extending therefrom around the perimeter of the rectangular front face, wherein the rectangular front face defines the circular hole and wherein the side walls meet the rectangular base when the rectangular cover is in the closed position.

17. An electric power meter cover constructed of a plastic material suitable for painting to match the color of an exterior wall to which the electric power meter cover is mounted, wherein the electric power meter comprises:
- a base defining a plurality of mounts for securing the base to an exterior wall to surround an electric power meter having a base and a meter cylinder extending therefrom;

a face defining an hole completely surrounded by and isolated on the face and positioned to pass the meter cylinder; and a plurality of hinges connecting the face to the base so that the face has a closed position against the base that completely covers the electric power meter with the meter cylinder passing through the hole, and an open position that permits access to the electric power meter and separates the face from the electric power meter so that the meter cylinder does not extend through the hole.

18. The electric power meter of claim 17, wherein the base comprises a u-shaped channel that includes a pair of side walls that extend substantially perpendicular from the exterior wall, and a front surface that joins the pair of side walls along an end opposite the exterior wall, and wherein the u-shaped channel defines an interior passage extending fully around the electric power meter.

19. The electric power meter of claim 18, wherein:

the plurality of hinges comprise a set of sleeves that extend from a top portion of the base, a set of sleeves that extend from a top of the face and engage the set of sleeves that extend from the base, and a set of pins that extend through the sleeves along a common axis so that the face and the base are connected by the pins so that the face rotates about the axis defined by the pins;

the face comprises:

a first sub-body defining a first front and a first side wall that extends back from the first front to meet the front surface of the u-shaped channel of the base when the face is in the closed position, wherein the first side wall extends around a first outer perimeter of the first sub-body, and wherein the first outer perimeter extends around the interior passage defined by the u-shaped channel of the base, a second sub-body defining a second front and a second side wall that extends back from the second front to join with the first front, wherein the second side wall extends around a second outer perimeter of the second sub-body, and wherein the second outer perimeter is smaller than the first outer perimeter, a front panel recessed from the second front of the second sub-body, and wherein the front panel defines the hole positioned to pass the meter cylinder, and an address panel recessed from the front panel, positioned adjacent to the hole and adapted to receive a label plate for an address;

a hasp positioned along the bottom of the face, wherein the hasp includes a sleeve extending from the face and a sleeve extending from the base so that when the face is in the closed position the sleeve extending from the face aligns with the sleeve extending from the base; and a lock passing through the sleeve extending from the face and the sleeve.

* * * * *